United States Patent [19]

Poppe

[11] 4,424,294

[45] Jan. 3, 1984

[54] INJECTION MOLDABLE AMIDE-IMIDE POLYMERS AND COPOLYMERS CONTAINING TITANATES

[75] Inventor: Wassily Poppe, Lombard, Ill.

[73] Assignee: Standard Oil Company, (Indiana), Chicago, Ill.

[21] Appl. No.: 480,937

[22] Filed: Mar. 31, 1983

Related U.S. Application Data

[63] Continuation-in-part of Ser. No. 283,438, Jul. 15, 1981.

[51] Int. Cl.³ .................. C08K 5/52; C08K 5/17; C08K 5/09
[52] U.S. Cl. .................. 524/127; 524/204; 524/398
[58] Field of Search .................. 524/127, 398, 204

[56] References Cited

U.S. PATENT DOCUMENTS

| | | | |
|---|---|---|---|
| 2,870,181 | 1/1959 | Drake | 260/45.75 F |
| 2,875,919 | 3/1959 | Henderson | 260/45.75 F |
| 2,933,465 | 4/1960 | Olson | 260/45.75 F |
| 3,347,828 | 10/1967 | Stephens | 528/188 |
| 3,416,994 | 12/1968 | Chalmers et al. | 260/37 N |
| 3,418,348 | 12/1968 | Shephard et al. | 260/45.75 F |
| 3,494,890 | 2/1970 | Morello | 528/188 |
| 3,573,260 | 3/1971 | Morello | 528/183 |
| 3,576,755 | 4/1971 | Patella et al. | 260/45.75 F |
| 3,647,739 | 3/1972 | Kay et al. | 260/45.75 F |
| 3,661,832 | 5/1972 | Stephens | 528/188 |
| 3,677,992 | 7/1972 | Morello | 528/188 |
| 3,697,475 | 10/1972 | Morris | 260/37 N |
| 3,716,514 | 2/1973 | Morello | 528/188 |
| 4,016,140 | 4/1977 | Morello | 264/331.19 |
| 4,206,098 | 6/1980 | Sattler et al. | 428/458 |
| 4,216,107 | 8/1980 | Vogt et al. | 260/45.75 F |

*Primary Examiner*—V. P. Hoke
*Attorney, Agent, or Firm*—Gunar J. Blumberg; William T. McClain; William H. Magidson

[57] ABSTRACT

Injection moldable amide-imide homopolymers and copolymers containing titanates. These amide-imides are useful in engineering plastic applications.

9 Claims, No Drawings

INJECTION MOLDABLE AMIDE-IMIDE POLYMERS AND COPOLYMERS CONTAINING TITANATES

BACKGROUND OF THE INVENTION

This is a continuation-in-part of Ser. No. 283,438 filed July 15, 1981.

FIELD OF THE INVENTION

The field of this invention relates to polyamide-imide polymers containing organic titanates and to molding powders and molded articles prepared therefrom.

BACKGROUND

Amide-imide polymers and copolymers are a relatively new class of organic comounds known for their solubility in nitrogen-containing solvents when in the largely polyamide form. In the past the major application of these amide-imide polymers has been as wire enamels. This is illustrated in U.S. Pat. Nos. 3,661,832 (1972), 3,494,890 (1970) and 3,347,828 (1967). Amide-imide polymers and copolymers have also been found useful for molding applications as shown in U.S. Pat. Nos. 4,016,140 (1977) and 3,573,260 (1971). Both are incorporated herein by reference. These polyamides are known for their outstanding mechanical properties, but they are also difficult to process particularly to injection mold. This difficulty is a consequence of insufficient flow of the polymer. The art has been looking for improvements in the flow of the polymers, but it is essential that an additive not impair the excellent mechanical properties of the polyamide-imide polymers and copolymers, particularly the flexural and heat deflection properties. The ideal flow improving agent for these polymers would be one which plasticizes the polymers during injection molding and cross-links the polymers and copolymers during curing or annealing step so that the plasticizing effect would be neutralized by cross-linking.

The general object of this invention is to provide polyamide-imide polymers and copolymers containing organic titanium esters. A more specific object of this invention is to provide polyamide-imide polymers and copolymers suitable for use as engineering plastics particularly for use in injection molding wherein the polymer flow is improved by the addition of about 0.5 to 2.0 percent by weight of titanium esters. Other objects appear hereinafter.

I have now found that amide-imide polymers and copolymers obtained by reacting a polycarboxylic acid anhydride with one or a mixture of primary diamines containing 0.5 to 2.0 percent of titanium esters has excellent flow properties and can readily be injection molded to provide engineering plastics with excellent properties but which can be produced at a much faster rate since the polymer flow has been substantially increased when compared to the polymers which do not contain the titanium esters. The titanium ester stabilized polymers of this invention are prepared by reacting an acyl halide derivative of an aromatic tricarboxylic-acid-anhydride with one or a mixture of largely- or wholly-aromatic primary diamines. The resulting products are polyamides wherein the linking groups are predominantly amide groups, although some may be imide groups, and wherein the structure contains free carboxylic acid groups which are capable of further reaction. Such polyamides are moderate molecular weight (7-13,000 as prepared) polymeric compounds having in their molecule units of:

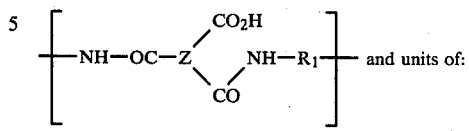 and units of:

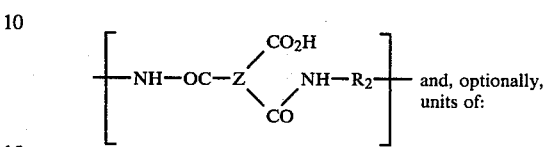 and, optionally, units of:

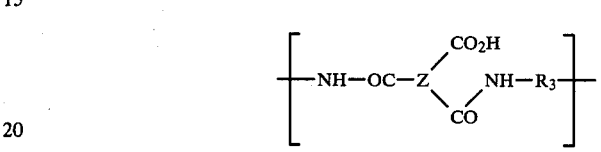

wherein the free carboxyl groups are ortho to one amide group, Z is an aromatic moiety containing 1 to 4 benzene rings or lower-alkyl-substituted benzene rings, $R_1$, $R_2$ and $R_3$ are the same for homopolymers and are different for copolymers and are divalent wholly- or largely-aromatic hydrocarbon radicals. These hydrocarbon radicals may be a divalent aromatic hydrocarbon radical of from 6 to about 10 carbon atoms, or two divalent aromatic hydrocarbon radicals each of from 6 to about 10 carbon atoms joined directly or by stable linkages such as —O—, methylene, —CO—, —SO$_2$—, —S—; for example, —R'—O—R'—, —R'—CH$_2$—R'—, —R'—CO—R'—, —R'—SO$_2$—R'— and —R'—S—R'—.

Said polyamides are capable of substantially complete imidization by heating by which they form the polyamide-imide structure having to a substantial extent recurring units of:

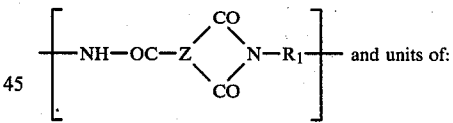 and units of:

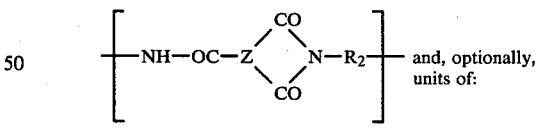 and, optionally, units of:

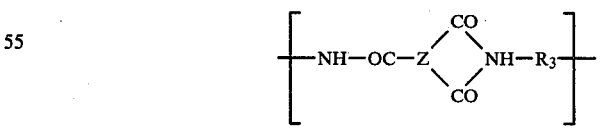

wherein one carbonyl group is meta to and one carbonyl group is para to each amide group and wherein Z, $R_1$, $R_2$ and $R_3$ are defined as above. Typical copolymers of this invention have up to about 50 percent imidization prior to heat treatment, typically about 10 to about 40 percent.

The polyamide-imide copolymers are prepared from an anhydride-containing substance and a mixture of wholly- or partially-aromatic primary diamines. Usefully the anhydride-containing substance is an acyl halide derivative of the anhydride of an aromatic tricarboxylic acid which contains 1 to 4 benzene or lower-alkyl-substituted benzene rings and wherein two of the carboxyl groups are ortho to one another. More preferably, the anhydride-containing substance is an acyl halide derivative of an acid anhydride having a single benzene or lower-alkyl-substituted benzene ring, and most preferably, the substance is the acyl chloride derivative of trimellitic acid anhydride (4-TMAC).

We can use a single diamine, but usefully the mixture of diamines contains two or more, preferably two or three, wholly- or largely-aromatic primary diamines. More particularly, they are wholly- or largely-aromatic primary diamines containing from 6 to about 10 carbon atoms or wholly- or largely-aromatic primary diamines composed of two divalent aromatic moieties of from 6 to about 10 carbon atoms, each moiety containing one primary amine group, and the moieties linked directly or through, for example, a bridging —O—, —S—, —SO$_2$—, —CO—, or methylene group. When three diamines are used they are preferably selected from the class composed of:

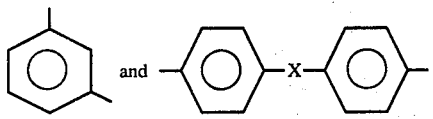

said X being an —O—, —CH$_2$—, or —SO$_2$— group. More preferably, the mixture of aromatic primary diamines is in the one-component or two-component and is composed of meta-phenylenediamine and p,p'-oxybis(aniline) and meta-phenylenediamine, or p,p'-sulfonylbis(aniline) and p,p'-methylenebis(aniline). Most preferably, the mixture of primary aromatic diamines contains meta-phenylenediamine and p,p'-oxybis(aniline). In the one-component system the preferred diamines are oxybis (aniline) or meta-phenylene diamine. The aromatic nature of the diamines provides the excellent thermal properties of the homopolymer copolymers while the primary amine groups permit the desired imide rings and amide linkages to be formed.

Usually the polymerization or copolymerization is carried out in the presence of a nitrogen-containing organic polar solvent such as N-methylpyrrolidone, N,N-dimethylformamide and N,N-dimethylacetamide. The reaction should be carried out under substantially anhydrous conditions and at a temperature below about 150° C. Most advantageously, the reaction is carried out from about 20° to about 50° C.

The reaction time is not critical and depends primarily on the reaction temperature. It may vary from about 1 to about 24 hours, with about 2 to 4 hours at about 30° to 50° C. preferred for the nitrogen-containing solvents.

In a suitable manner 10 to 15 percent solution of the titanium ester in question in an organic alcohol such as isopropanol is prepared then the amide-imide resin; either the homopolymer or copolymer in powder, pellet, filled or unfilled form is sprayed with the solution so that about ½ to 1½ percent titanium ester has been incorporated into the amide-imide copolymer. Useful titanium esters include the following: isopropyl tri(dioctylpyrophosphato)titanate (KR38S), isopropyl tri(N-ethylamino-ethylamino)titanate (KR44S), di(dioctylprophosphato)ethylene titanate (KR238S), isopropyl tri(isostearoyl)titanate, titanium di(dioctylpyrophosphate)oxyacetate, isopropyltriacryl titanate and isopropyl tri(2-aminobenzoyl)titanate.

The chemical structures for the useful titanates are given hereinbelow.

isopropyl tri(dioctylpyrophosphato)titanate

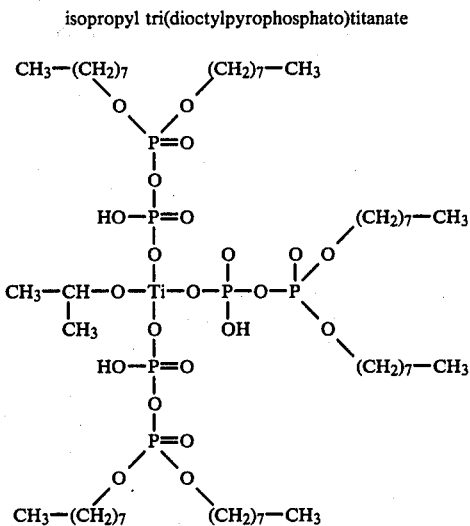

isopropyl tri(N—ethylamino-ethylamino)titanate

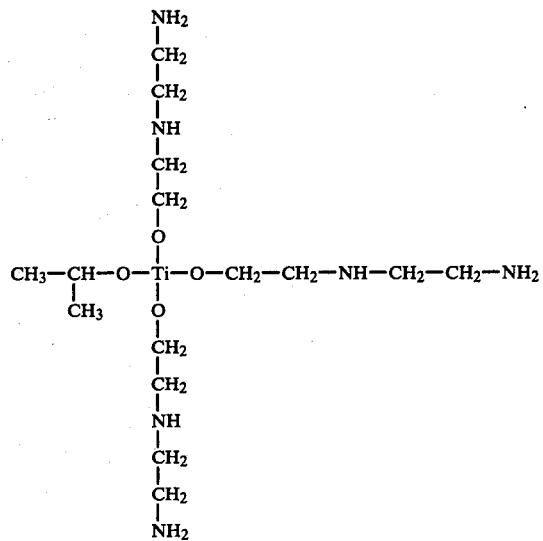

di(dioctylpyrophosphato)ethylene titanate

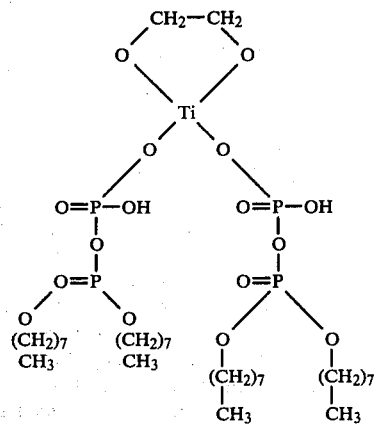

-continued isopropyl tri(isostearoyl)titanate

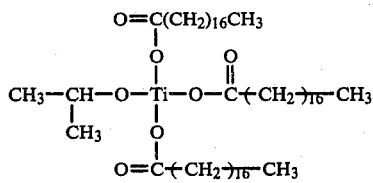

titanium di(dioctylpyrophosphate)oxyacetate

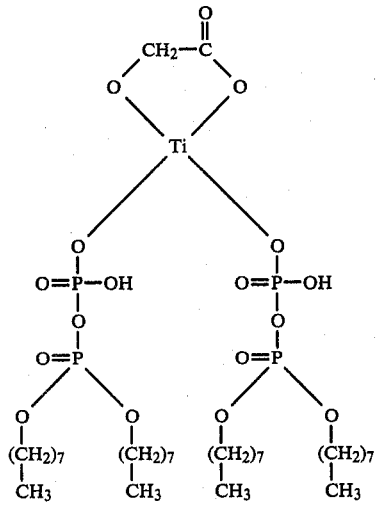

isopropyl triacryl titanate

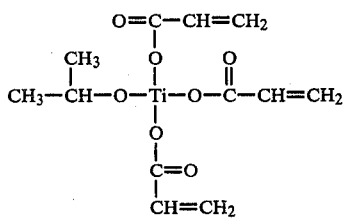

isopropyl tri(2-aminobenzoyl)titanate

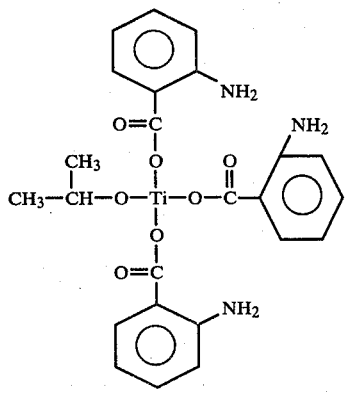

Table 2 shows physical properties of the samples after annealing at the schedule shown in Table 3. All the samples except the control were molded on the 1½ ounce Arburg injection molding equipment. These samples were molded on a 6 ounce Stokes. The data in the cited tables demonstrate a definite flow improvement without detriment to the homopolymer copolymer properties. The excellent flow of our titanium ester modified copolyamide-imides and polyamide-imides was demonstrated by the sensitive cavity pressure measurements which have been used to produce the flow and viscosity of amide-imide copolymers.

Cavity pressure measurements are used as quality control checks of polyimide-imide resin viscosity. Pressure buildup during the filling of an injection molded part is measured at a point in the cavity (ejector pin). This is accomplished by placing a pressure transducer behind the ejector pin and recording the pressure with a chart recorder or other readout device. Cavity pressure normally rises as the mold is being filled and peaks as the molten resin is packed into the cavity. As the resin solidifies, cavity pressure decreases.

We have found that resins that have low cavity pressure process poorly and that spiral flow measurements were not sensitive enough to discriminate between resins in the viscosity range of interest. Low cavity pressures indicate a large pressure drop between injection and cavity pressures. This indicates higher resin viscosities. In the same manner high cavity pressures indicate less pressure change between injection and cavity pressures, suggesting lower resin viscosities.

Amide-imide polymer and copolymer viscosities had been measured by spiral flow determinations previous to the implementation of the cavity pressure procedure, see U.S. Pat. No. 4,224,214. Cavity pressure was selected over spiral because of its greater sensitivity. The cavity pressure test has been implemented as an amide-imide homopolymer and copolymer quality control procedure. Like spiral flow, cavity pressure is a test that can be done conveniently in a molder's shop.

The injection molding machine was an Arburg Model 221E/150 equipped with a vertically mounted thermoset screw and barrel assembly. The mold was heated with hot oil from a Mokon Model MC210 heating unit. Cavity pressure was recorded with a Control Process Model 241 recorder. Our mold was equipped to handle pressure transducers at the ejector pins located at the gate end of the tensile bar and the gate end of the flex bar before we began our work. Since it was desirable to make cavity pressure measurements at the dead end of the flex bar, it was necessary to make some modifications in the mold base to accommodate a transducer at this pin position.

Resins were dried in a vacuum (2 mm Hg) oven at 300° F. for at least 16 hours before testing. Moisture in amide-imide homopolymer copolymers has a very significant effect on its flow properties, therefore special care was taken to be sure the samples were properly dried. This drying procedure was used before making flow rate and cavity pressure measurements.

The flow rate procedure was patterned after the standard method described in ASTM D1238. I used a 335° C. (635° F.) barrel temperature with a 30 minute preheat time. This is about the largest set of weights that can be used safely with the standard extrusion plastometer apparatus. I used a standard 0.0825 in. diameter, and a 0.315 in. long orifice.

Special care was taken to be sure that each flow rate measurement was started when an equivalent volume of resin was in the barrel. Previous rheology work indicated that there is a very large "barrel height" effect on amide-imide homopolymers and copolymers. Each flow rate measurement was initiated while the top of the piston collar was between the two scribe marks on the piston. This precaution is also required by ASTM in method D1238.

I have found that the amide-imide homopolymers and copolymers are improved by the addition of reinforcing material; particularly, the mechanical properties of the polyimides are improved if these copolyimides contain from about 25 to 60 percent by weight glass fibers, glass beads, industrial materials such as talc, or graphite or mixtures thereof. In the preferred range the polyimides contain 30 to 40 percent by weight of the glass fibers, glass beads, talc or graphite or mixtures thereof. Suitably reinforcing materials can be glass fibers, glass beads, glass spheres, glass fabrics. The glass fibers are made of alkali-free boron-silicate glass or alkali-containing C-glass. The thickness of the fiber is suitably on the average between 3 mm and 30 mm. It is possible to use both long fibers with average lengths of from 5 to 50 mm and also short fibers of average filament lengths from 0.05 to 5 mm. In principle, any standard commercial-grade fibers especially glass fibers may be used. Glass beads ranging from 5 um to 50 um in diameter may also be used as a reinforcing material.

The reinforced polyamide-imide homopolymers and copolymers may be prepared in various ways. For example, so-called roving endless glass fiber strands are coated with the polyamic acid melt and subsequently granulated. The cut fibers or the glass beads may also be mixed with granulated polyamic acid and the resulting mixture melted in a conventional extruder, or alternatively the fibers may be directed, introduced into the polyamic acid melt through a suitable inlet in the extruder. Injection molding of the unfilled or glass-filled copolyamide-imides is accomplished by injecting the copolyamide-imides into a mold maintained at a temperature of about 350° F. to 450° F. In this process a 15 to 30 second cycle is used with a barrel temperature of about 580° to 640° F. The injection molding conditions are given in Table 1.

TABLE I

| Mold Temperature | 350° F. to 450° F. |
|---|---|
| Injection Pressure | 17,000 to 23,000 psi and held for 3 to 7 seconds |
| Back Pressure | 100 to 500 psi |
| Cycle Time | 15 to 30 seconds |
| Extruder: | |
| Nozzle Temperature | 610° F. to 650° F. |
| Barrels: | |
| Front heated to | 580° F. to 640° F. |
| Screw: | |
| 20 to 25 revolutions/minute | |

The mechanical properties of the unfilled amide-imide copolymers containing titanates and also the filled amide-imide copolymers are given in Table 2 and it shows that these homopolymers and copolymers have excellent mechanical and thermal properties despite the fact that they contain 0.5 to 1.5% titanates.

The following examples illustrate the preferred embodiment of the invention. It will be understood that the examples are for illustrative purposes only and do not purport to be wholly definitive with respect to conditions or scope of the invention.

EXAMPLE I

A 690 gram portion of dimethylacetamide was stirred and cooled to 5° C. with dry nitrogen purging to keep the system dry. An intimate mixture composed of 252.2 grams of 4-TMAC, 119.0 grams of p,p'-methylenebis-(aniline), and 120.0 grams of p,p'-oxybis(aniline) was then added to the solvent over a period of 30 minutes. The temperature of the reaction was allowed to rise to 50° C. At that temperature it was controlled by means of an ice bath. An additional 100 grams of DMAC was then added to wash in all solids, and the reaction continued for another 3½ hours at 50° C. The reaction solution was then poured into a large excess of rapidly-agitated water, whereupon precipitation of the copolymer took place. The solids were then washed several times with distilled water and soaked overnight. Finally, the solids were dried at 120° F. A 443 gram yield of the copolymer was obtained.

EXAMPLE II

A solution consisting of 533.3 grams of NMP, 300 grams of DMAC, and 58.0 grams of propylene oxide was stirred and cooled to 8° C. A mixture of 168.5 grams of 4-TMAC, 80.1 grams of OBA, and 79.3 grams of MBA was then added to the solvent over a period of 50 minutes. During this time the reaction was allowed to warm to 36° C. An additional 66.7 grams of NMP was added to wash in all solids, then the reaction mixture was heated to 50° C. and held at that temperature for 3½ hours. The solution was then filtered.

EXAMPLE III

The general procedure for preparing a copolymer containing three diamines is illustrated by the reaction of OBA, MPDA and MBA and 4-TMAC in DMAC. Thus, a 242.0 gram portion of OBA (1.21 moles), a 130.7 gram portion of MPDA (1.21 moles) and a 239.6 gram portion of MBA (1.21 moles) were dissolved in 3,900 grams DMAC contained in a 6-liter flask equipped with a nitrogen purge, stirrer, addition funnel and thermometer. A 765 gram portion of 4-TMAC (3.63 moles) in flake or lump form was then added to the solution in portions over 90 minutes. The reaction exotherm was allowed to raise the temperature to about 35° C. The reaction temperature was maintained at 33°-38° C. for the remainder of the 4-TMAC addition using cooling water when necessary. After the TMAC addition was completed, any residual TMAC clinging to the addition funnel was completely washed into the reaction solution with 70 grams DMAC. A heating mantle was applied to the reaction flask and the temperature quickly raised (about 20 min.) to 50° C. The reaction solution was stirred at 50° C. for 90 minutes and then the solution precipitated by admixing with water. Prior to precipitation the solution viscosity was about 7.5 stokes (25° C., 20 percent solids). The polymer was precipitated in distilled water in a model D, W. J. Fitzpatrick Company, comminuting machine (Fitz mill). After precipitation the polymer was washed with distilled water to aqueous pH 4 to 5 (3 to 4 hours washing time), then filtered onto large Buchner funnels. The polymer was dried overnight by drawing air through the funnels, then finally dried in an aeromat drier at 30°-35° C. for 12-15 hours.

EXAMPLE IV

A 78 gram amount of the copolymer in powdered form made according to the procedure set forth in Example 1 was heated at 550° F. for about 1 hour. It was then cooled and charged cold into a mold preheated in the press to about 600° to about 650° F. A maximum pressure of 4,200 p.s.i. was applied over a 25 minute period and thereafter the mold and contents cooled to 500° F. under a pressure of 2,100 p.s.i. and the molded item immediately ejected. A disk measuring 5½ inches in diameter and ⅛ inch thick had been formed.

EXAMPLE V

The titanium ester addition was made as follows: a 10% to 15% solution of the titanate in question in isopropanol was prepared. Then the amide-imide resin as prepared in Examples 1 through 4 in powder form, pellet, filled or unfilled form resin was sprayed with the solution so that either 0.5 or 1.5% titanate has been incorporated. Table 2 shows the physical properties of the prepared samples, after annealing at the schedule shown on Table 3. All the samples except 5994-7-1 (control) and 5994-7-2 (1.5% tri(N-ethylamino)titanate) were molded on the 1½-ounce Arburg. The two above-mentioned samples were molded on the 6-ounce Stokes and their cavity pressure was measured as follows: 5994-7-1 (control) at 14,000 psi, 5994-7-2 (1.5% KR44S) at 17,600 psi. This represents a definite flow improvement and as we can see from Table 2 without detriment to copolyamide-imide properties.

EXAMPLE VI

In another version, treated copolyamide-imides in pellet form were prepared with titanates containing 3% $TiO_2$. Two samples were prepared, 5994-15-1 (4203*+1.5% KR44S) and 5994-15-2 (4203+1.5% KR44S+1% additional $TiO_2$). The addition of 1% $TiO_2$ to the sprayed pellets of the copolyamide-imide has been done to decrease possible slippage which we have seen previously on smaller machines. During the determination of cavity pressure, slippage was not observed. As we can see from Table 3, 4203 with titanate alone showed a slightly higher cavity pressure (10,700 psi) than 4203 with titanate and $TiO_2$ (10,100 psi) but both were significantly higher than the control (8500).
*4203=copolyamide prepared as in Example 1.

EXAMPLE VII

Another trial was carried out by treating 40 pounds of the copolyamide as prepared in Example 1 (Lot 00229) with 1.5% tri(N-ethylamino-ethylamino)titanate. This experiment demonstrates that the titanate ester will conserve its flow-improving property after the heat history of compounding and extrusion. The comparison of the processing conditions of the copolyamide-imide resin to 4203L can be seen in Table 5. According to the report of the operator who performed the extrusion, no special problems in connection with the 1.5% titanate sample have been observed. Some slightly higher amperage was necessary to extrude the titanate sample. This could be interpreted as a consequence of flow difficulties. On the other hand, the slightly lower temperature used for the same sample might be indicative for better flow. The ultimate flow criteria is the cavity pressure which according to Table 6 was about 2,700 psi higher for the titanate sample. Also, according to Table 6, the physical properties of the titanate sample were up to standard.

TABLE 2
AMIDE-IMIDE COPOLYMERS WITH TITANATE ADDITION

|  | 4000T Control | 4000T +0.5% KR44S | 4000T +1.5% KR44S | 4000T +0.5% KR38S |
|---|---|---|---|---|
| Notched Izod (ft-lb/in) | 2.97 | 2.72 | 2.23 | 3.15 |
| U.T.S. (PSI) | 25,700 | 24,401 | 24,200 | 23,900 |
| Break (%) | 13.6 | 12.0 | 13.4 | 13.7 |
| Flexural Strength (PSI) | 31,400 | 31,200 | 30,500 | 29,900 |
| Flexural Modulus (PSI) | 674,000 | 698,000 | 630,000 | 641,000 |
| Heat Deflection Temp., 264 PSI (°F.) | 529 | 527 | 531 | 531 |

TABLE 2-continued
AMIDE-IMIDE COPOLYMERS WITH TITANATE ADDITION

|  | 4000T +1.5% KR38S | 4000T +0.5% KR238S | 4000T +1.5% KR238S |
|---|---|---|---|
| Notched Izod (ft-lb/in) | 2.86 | 2.74 | 2.5 |
| U.T.S. (PSI) | 25,040 | 24,000 | 22,000 |
| Break (%) | 13.9 | 15.50 | 11.5 |
| Flexural Strength (PSI) | 30,700 | 29,400 | 27,600 |
| Flexural Modulus (PSI) | 615,000 | 630,000 | 660,000 |
| Heat Deflection Temp., 264 PSI (°F.) | 523 | 530 | 531 |

4000T = Copolyamide prepared according to the procedure of Example 1
KR44S = isopropyl tri(N—ethylamino-ethylamino)titanate
KR38S = isopropyl tri(dioctylpyrophosphato)titanate
KR238S = di(dioctylpyrophosphato)ethylene titanate

TABLE 3
ANNEALING SCHEDULES

| I. | Annealing schedule used in the examples contained in the disclosure | |
|---|---|---|
|  | Days | Temperature °F. |
|  | 1 (24 hours) | 300 |
|  | 1 (24 hours) | 450 |
|  | 1 (24 hours) | 470 |
|  | 3 (72 hours) | 500 |
| II. | Quality control annealing schedule | |
|  | Days | Temperature °F. |
|  | 1 (24 hours) | 330 |
|  | 1 (24 hours) | 470 |
|  | 2 (48 hours) | 500 |

Note:
According to results obtained in both schedules, not much differecne has been noted between them.

TABLE 4
PHYSICAL PROPERTIES OF TORLON RESIN 4203L SPRAYED WITH TITANATE ESTER KR44S

|  | ASTM Method | 4203 +1.5% KR44S | 4203 +1.5% KR44S + 1% $TiO_2$ | 4203 Control |
|---|---|---|---|---|
| Notched Izod (PSI) | D-256 | 1.90 | 1.77 | 2.35 |
| U.T.S. (PSI) | D-308 | 28,300 | 27,500 | 29,600 |
| Break (%) | D-630 | 14.7 | 13.3 | 15.1 |
| Flexural Strength (PSI) | D-638 | 35,800 | 34,100 | 36,300 |
| Flexural Modulus (PSI) | D-790 | 784,000 | 806,000 | 761,000 |
| Heat Deflection Temp., 264 PSI (°F.) | D-48 | 530 | 531 | 532 |
| Cavity Pressure (PSI) |  | 10,700 | 10,100 | 8,500 |

4203 = Copolyamide-imide prepared as in Example 1, but containing 1% $TiO_2$ polymer in pellet form.
Titanates the same as shown at the bottom of Table 2.

TABLE 5
PROCESSING CONDITIONS FOR 4000T/KR44S

| Run Number | C-823 | C-824 |
|---|---|---|
| Date | 6-6-80 | 6-6-80 |
| Temperature, Zone 1, °F. | 625 | 620 |
| Temperature, Zone 2, °F. | 615 | 615 |
| Adaptor, Temperature, °F. | 550 | 545 |
| Die Temperature, °F. | 615 | 615 |
| Current, Amp | 11.8–12.2 | 12.0–12.5 |
| Screw Section | Regular | Regular |
| Screw RPM | 30 | 30 |
| Net Pellets, lbs. | 24 | 38 |
| TORLON Lot No. | 00229 | (00229) |
| $TiO_2$ % | 3 | 3 |
| PTFE (5–10) % | 0.5 | 0.5 |
| KR44S % | — | 1.5 |

4000T = Copolyamide-imide prepared as in Example 1.
KR44S = isopropyl tri(N—ethylamino-ethylamino)titanate

TABLE 6
PHYSICAL PROPERTIES OF POLYAMIDE-IMIDE COPOLYMERS WITH AND WITHOUT TITANATE ESTER

| | ASTM Method | Control | 4203L +1.5% KR44S | 4203L Literature |
|---|---|---|---|---|
| Notched Izod (PSI) | D-256 | 1.88 | 2.28 | 2.5 |
| U.T.S. (PSI) | D-308 | 24,900 | 25,300 | 26,900 |
| Break (%) | D-630 | 9.88 | 15.3 | 12.0 |
| Flexural Strength (PSI) | D-638 | 35,200 | 31,400 | 30,700 |
| Flexural Modulus (PSI) | D-790 | 755,000 | 650,000 | 660,000 |
| Heat Deflection Temp., 264 PSI (°F.) | D-48 | 527 | 528 | 525 |
| Cavity Pressure (PSI) | | 13,900 | 16,600 | 14,000 |

4203L = Prepared according to the procedure shown in Examples 1 and 2
KR44S = isopropyl tri(N—ethylamino-ethylamino)titanate

I claim:

1. As a composition of matter, an injection moldable amide-imide copolymer containing about 0.5 to 1.5 percent by weight of titanate esters selected from the group consisting essentially of isopropyl tri(dioctylprophosphato)titanate, isopropyl tri(N-ethylamino-ethylamino)titanate, di(dioctylprophosphato)ethylene titanate, isopropyl tri(isostearoyl)titanate, titanium di(dioctylpyrophosphato)oxyacetate, isopropyl triacryl titanate and isopropyl tri(2-aminobenzoyl)titanate, the copolymer comprising units of:

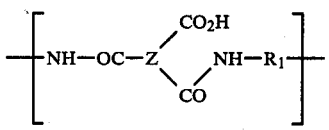

and units of:

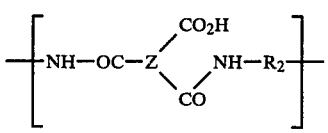

wherein the free carboxyl groups are ortho to one amide group, Z is a trivalent benzene ring or lower-alkyl-substituted trivalent benzene ring, $R_1$ and $R_2$ are the same or are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —$SO_2$— and —S—radicals and wherein said $R_1$ and $R_2$ containing units run from about 10 mole percent $R_1$ containing unit and about 90 mole percent $R_2$ containing unit to about 90 mole percent $R_1$ containing unit to about 10 mole percent $R_2$ containing unit.

2. As a composition of matter, an injection moldable amide-imide copolymer containing about 0.5 to 1.5 percent by weight of titanate esters selected from the group consisting essentially of isopropyl tri(dioctylprophosphato)titanate, isopropyl tri(N-ethylamino-ethylamino)titanate, di(dioctylprophosphato)ethylene titanate, isopropyl tri(isostearoyl)titanate, titanium di(dioctylpyrophosphato)oxyacetate, isopropyl triacryl titanate and isopropyl tri(2-aminobenzoyl)titanate, the copolymer comprising units of:

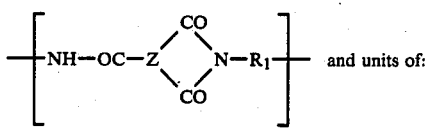

and units of:

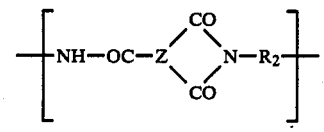

wherein one carbonyl group is meta to and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —$SO_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

3. As a composition of matter, an injection moldable copolymer containing about 0.5 to 1.5 percent by weight of titanate esters, selected from the group consisting essentially of isopropyl tri(dioctylprophosphato)titanate, isopropyl tri(N-ethylamino-ethylamino)titanate, di(dioctylprophosphato)ethylene titanate, isopropyl tri(isostearoyl)titanate, titanium di(dioctylpyrophosphato)oxyacetate, isopropyl triacryl titanate and isopropyl tri(2-aminobenzoyl)titanate, the copolymer comprising A units of:

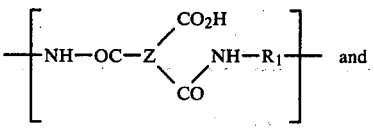

and

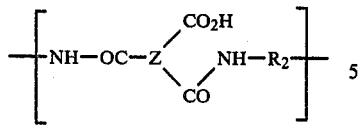

wherein the free carboxyl groups are ortho to one amide group and B units of:

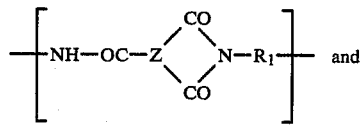

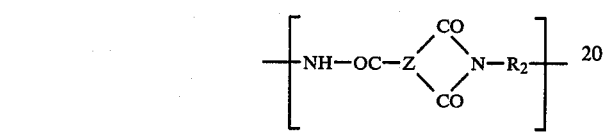

wherein one carbonyl group is meta to and one carbonyl group is para to each amide group and wherein Z is a trivalent benzene ring or lower-alkyl-substituted trivalent benzene ring, $R_1$ and $R_2$ are the same or are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO$_2$— and —S— radicals and wherein the proportions of A and B units run from about 1 mole percent A units and about 99 mole percent B units to about 99 mole percent A units and about 1 mole percent B units and wherein the $R_1$ and $R_2$ containing components of the A and B units run from about 10 mole percent $R_1$ containing components and about 90 mole percent $R_2$ containing components to about 90 mole percent $R_1$ containing components and about 10 mole percent $R_2$ containing components.

4. The copolymer of claim 1 wherein $R_1$ is

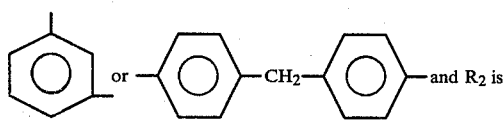

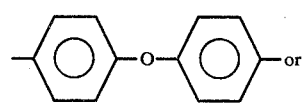

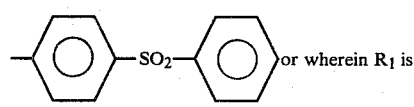

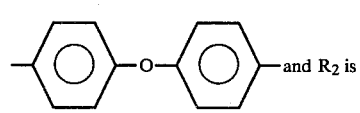

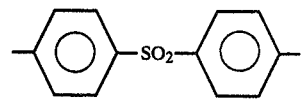

5. The copolymer of claim 2 wherein $R_1$ is

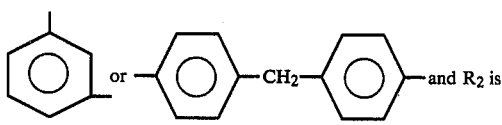

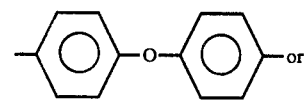

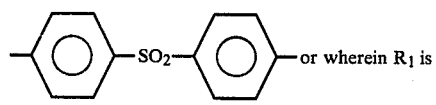

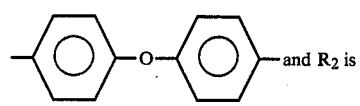

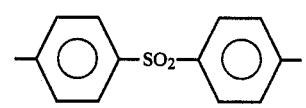

6. The copolymer of claim 3 wherein $R_1$ is

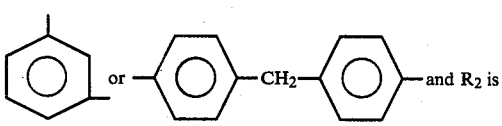

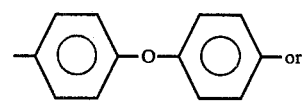

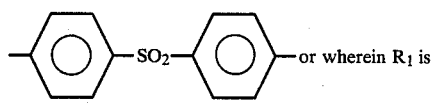

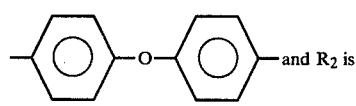

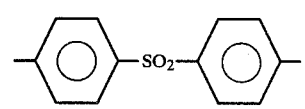

7. The copolymer of claim 1 wherein Z is a trivalent benzene ring, $R_1$ is

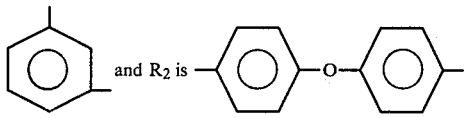

and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

8. The copolymer of claim 2 wherein Z is a trivalent benzene ring, $R_1$ is

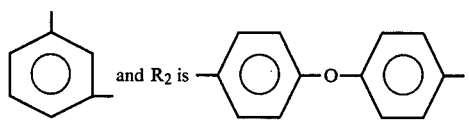

and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

9. The copolymer of claim 3 wherein Z is a trivalent benzene ring, $R_1$ is and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

* * * * *